(12) United States Patent
Yadollahi et al.

(10) Patent No.: US 11,384,585 B2
(45) Date of Patent: Jul. 12, 2022

(54) SHOCK ABSORBER CONFIGURED WITH A DEFORMABLE ENERGY ABSORBING MEMBER

(71) Applicant: Adams Rite Aerospace Inc., Fullerton, CA (US)

(72) Inventors: Morteza Yadollahi, Fullerton, CA (US); Alan Manara, Fullerton, CA (US)

(73) Assignee: ADAMS RITE AEROSPACE INC., Fullerton, CA (US)

( * ) Notice: Subject to any disclaimer, the term of this patent is extended or adjusted under 35 U.S.C. 154(b) by 736 days.

(21) Appl. No.: 16/250,135

(22) Filed: Jan. 17, 2019

(65) Prior Publication Data

US 2019/0218843 A1 Jul. 18, 2019

Related U.S. Application Data

(60) Provisional application No. 62/618,546, filed on Jan. 17, 2018.

(51) Int. Cl.
*F16F 7/12* (2006.01)
*F16F 9/16* (2006.01)
(Continued)

(52) U.S. Cl.
CPC .............. *E05F 5/06* (2013.01); *B64C 1/1469* (2013.01); *E05B 77/54* (2013.01); *E05B 81/56* (2013.01); *E05F 3/04* (2013.01); *E05F 5/10* (2013.01); *F16F 7/121* (2013.01); *F16F 7/125* (2013.01); *F16F 9/003* (2013.01); *F16F 9/19* (2013.01); *F16F 9/48* (2013.01);
(Continued)

(58) Field of Classification Search
CPC .... F16F 7/12; F16F 7/121; F16F 7/125; F16F 9/165; F16F 9/185; F16F 9/19; F16F 9/30; F16F 9/303; F16F 9/585; F16F 9/003
USPC .......................................................... 188/268
See application file for complete search history.

(56) References Cited

U.S. PATENT DOCUMENTS 3,179,398 A * 4/1965 Pepper ................. E21B 43/127
267/118
3,231,255 A * 1/1966 Olson ..................... F16F 9/003
267/127
(Continued)

FOREIGN PATENT DOCUMENTS

| DE | 2744301 A1 * | 4/1979 | ............. F16F 9/003 |
|---|---|---|---|
| DE | 102009012515 A1 * | 9/2010 | ............. F16F 9/055 |
| EP | 1920006 A2 * | 5/2008 | .......... B29C 61/003 |
| FR | 2194267 A6 * | 2/1974 | ............. F16F 9/346 |
| FR | 2653870 A1 * | 5/1991 | ............. F41A 25/06 |
| GB | 748469 A * | 5/1956 | ............. F16F 9/064 |

(Continued)

Primary Examiner — Thomas J Williams
(74) Attorney, Agent, or Firm — BakerHostetler

(57) ABSTRACT

A shock absorber includes a first end configured to be mechanically fastened to a first component, a second end configured to be mechanically fastened to a second component, a main body, a main shaft, and a primary piston. The primary piston configured to move within the main body and further configured to provide a first damping force by movement of a fluid through the primary piston while the main shaft moves a first distance. The shock absorber also includes a deformable solid material arranged in the main body. The primary piston configured to further move within the main body and further configured to provide a second damping force by deforming the deformable solid material after the main shaft moves the first distance.

20 Claims, 7 Drawing Sheets

(51) Int. Cl.

| | | |
|---|---|---|
| *F16F 9/30* | (2006.01) | |
| *E05F 5/06* | (2006.01) | |
| *B64C 1/14* | (2006.01) | |
| *F16F 9/19* | (2006.01) | |
| *F16F 9/48* | (2006.01) | |
| *E05B 81/56* | (2014.01) | |
| *E05B 77/54* | (2014.01) | |
| *E05F 3/04* | (2006.01) | |
| *E05F 5/10* | (2006.01) | |
| *F16F 9/00* | (2006.01) | |
| *B64C 1/00* | (2006.01) | |

(52) U.S. Cl.
 CPC ... *B64C 2001/009* (2013.01); *E05Y 2201/212* (2013.01); *E05Y 2900/502* (2013.01); *E05Y 2900/531* (2013.01); *F16F 9/165* (2013.01); *F16F 9/303* (2013.01); *F16F 2228/066* (2013.01); *F16F 2236/04* (2013.01)

(56) References Cited

U.S. PATENT DOCUMENTS

| | | | | |
|---|---|---|---|---|
| 3,265,163 | A * | 8/1966 | Gilbert | B64C 25/62 188/269 |
| 3,801,087 | A * | 4/1974 | Akaike | F16F 9/067 267/139 |
| 3,888,531 | A * | 6/1975 | Straza | F16F 7/121 293/120 |
| 5,927,646 | A * | 7/1999 | Sandy | B64C 25/52 244/108 |
| 8,091,692 | B2 * | 1/2012 | Deshmukh | F16F 9/003 188/267.2 |
| 2008/0092630 | A1 * | 4/2008 | Piorkowski | G01N 7/00 73/31.04 |

FOREIGN PATENT DOCUMENTS

| | | | | |
|---|---|---|---|---|
| KR | 20090122020 A | * | 11/2009 | |
| WO | WO-2013165586 A1 | * | 11/2013 | ............ F15B 11/076 |

* cited by examiner

SHOCK ABSORBER CONFIGURED WITH A DEFORMABLE ENERGY ABSORBING MEMBER

CROSS REFERENCE TO PRIOR APPLICATIONS

This application claims the benefit of U.S. Provisional Patent Application No. 62/618,546 filed Jan. 17, 2018, which is hereby incorporated by reference in its entirety for all purposes as if fully set forth herein.

FIELD OF THE DISCLOSURE

The disclosure relates to a shock absorber. Specifically, the disclosure relates to a shock absorber configured with a deformable energy absorbing member. More specifically, one aspect of the disclosure relates to a cockpit door shock absorber configured with a deformable energy absorbing member. Even more specifically, one aspect the disclosure relates to a cockpit door shock absorber configured for operation during decompression events.

BACKGROUND OF THE DISCLOSURE

A shock absorber is typically a mechanical or hydraulic device designed to absorb and damp shock impulses. The shock absorber does this by converting the kinetic energy of the shock into another form of energy. This energy may typically be in the form of heat. Subsequently, the energy is then dissipated. Most shock absorbers are a form of dashpot (a damper which resists motion via viscous friction).

However, a typical shock absorber has a limited operational envelope and cannot shock impulses or forces at extreme ends of an operational envelope needed in some specific applications. Failure to provide shock absorption in the specific applications that may be subject to an extreme range of forces may result in damage to the application to which the shock absorber is implemented or injury to individuals proximate to the application.

Accordingly, what is needed is a shock absorber that provides an extreme range of shock absorption to an application to limit damage and injury.

One such application may be aircraft. Aircraft are generally equipped with at least one cockpit door. The aircraft often has a separating partition that includes the at least one cockpit door that is located between a pilot, copilot, and/or flight crew (hereinafter referred to as "pilot") and passengers. The cockpit door provides security and privacy to the cockpit for the pilot. In this regard, the term "cockpit" refers to a location of the aircraft where the pilot is located during operation of the aircraft. The cockpit may also be known as the "flight deck." This is distinguished from the cabin, which refers to a portion of the aircraft where passengers are typically located.

In many aircraft, it is required that the ambient air pressure in the cockpit be generally the same as the ambient air pressure in the passenger cabin of the aircraft. A dangerous situation may arise if there is a sufficiently great pressure difference between opposite sides of the cockpit door or any compartments separated by the partition within the aircraft. One cause of a pressure difference may be a loss of cockpit pressurization. Loss of cockpit pressurization is a potentially serious emergency in an aircraft flying at normal cruising altitude. Loss of cockpit pressure, or depressurization, is typically classified as explosive, rapid, or gradual, based on the time interval over which cockpit pressure is lost. A pressure difference caused by a loss of pressurization, depressurization, or decompression (hereinafter generally referred to as decompression) can cause structural deformation, structural damage, and possibly lead to the loss of the aircraft.

Typically, the cockpit door may be locked or unlocked by operation of a door latch. The door latch may be a fully mechanical component, an electromechanical component, or the like. There exists some systems where the cockpit door may be opened by automatic operation of the door latch in response to a decompression event to limit damage. However, during such decompression, especially during explosive or rapid decompression, the cockpit door once automatically unlocked can be subjected to a great deal of force due to the pressure differential. This pressure differential and/or force results in the door opening at a very high rotational velocity about the associated hinges that results in possible structural deformation and/or structural damage to the door as well as the cockpit and other portions of the aircraft. Moreover, this scenario could also result in possible debris and flying parts within the cockpit that may damage critical aircraft controls and/or injure the pilot that could possibly lead to the loss of the aircraft.

Accordingly, what is further needed is a mechanism that limits movement of the cockpit door during episodes of decompression to limit damage and injury.

SUMMARY OF THE DISCLOSURE

Aspects of the disclosure are directed to a shock absorber with a crushable or deformable energy absorber or dissipater member. In particular, the disclosure discloses a shock absorber with two added members (secondary piston and crushable foam/honeycomb) that is designed to crush if the force or energy applied to the shock absorber exceeds a set limit. In this regard, if the primary piston is moved very fast and a fluid cannot exit an orifice fast enough, the fluid is compressed and its pressure is increased, which causes the secondary piston to move and start crushing the crushable member. This functionality thus dissipating or absorbing the energy by deforming the crushable member permanently or temporarily. In various aspects, the shock absorber is designed to transmit the energy in a direct or indirect manner to the crushable member. The disclosure sets forth at least two different aspects, but other geometries are possible to direct the energy that needs to be dissipated to the deformable member.

Further aspects of the disclosure advantageously provide a cockpit door shock absorber configured for operation during decompression events to limit damage and/or injuries. However, it should be noted that the shock absorber disclosed in the following disclosure need not be limited to implementations within the cockpit door. The disclosed shock absorber has numerous other possible system implementations for other types of doors and other types of moving structures. In other words, any system or application that has a moving structure can benefit from the disclosed shock absorber. However, for brevity of disclosure, the disclosure will focus on an aircraft application.

One general aspect includes a shock absorber, including: a first end configured to be mechanically fastened to a first component. The shock absorber also includes a second end configured to be mechanically fastened to a second component. The shock absorber also includes a main body that is attached to the first end. The shock absorber also includes a main shaft that is attached to the second end. The shock absorber also includes a primary piston configured to be received in the main body. The shock absorber also includes the primary piston being attached to the main shaft and the primary piston being further configured to be movable with the main shaft. The shock absorber also includes the primary piston configured to move within the main body and further configured to provide a first damping force by movement of a fluid through the primary piston while the main shaft moves a first distance. The shock absorber also includes a deformable solid material arranged in the main body. The shock absorber also includes the primary piston configured to further move within the main body and further configured to provide a second damping force by deforming the deformable solid material after the main shaft moves the first distance. The shock absorber also includes where one of the first component and the second component includes a fixed structure. The shock absorber also includes where another one of the first component and the second component includes a movable structure.

One general aspect includes a process of implementing a shock absorber, including: configuring a first end to be mechanically fastened to a first component. The process of implementing also includes configuring a second end to be mechanically fastened to a second component. The process of implementing also includes configuring a main body to be attached to the first end. The process of implementing also includes configuring a main shaft to be attached to the second end. The process of implementing also includes configuring a primary piston to be received in the main body. The process of implementing also includes configuring the primary piston to be attached to the main shaft and the primary piston being further configured to be movable with the main shaft. The process of implementing also includes configuring the primary piston to move within the main body to provide a first damping force by movement of a fluid through the primary piston while the main shaft moves a first distance. The process of implementing also includes configuring a deformable solid material in the main body. The process of implementing also includes configuring the primary piston to further move within the main body to provide a second damping force by deforming the deformable solid material after the main shaft moves the first distance. The process of implementing also includes where one of the first component and the second component includes a fixed structure. The process of implementing also includes where another one of the first component and the second component includes a movable structure.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION OF THE DISCLOSURE

Figure 1:
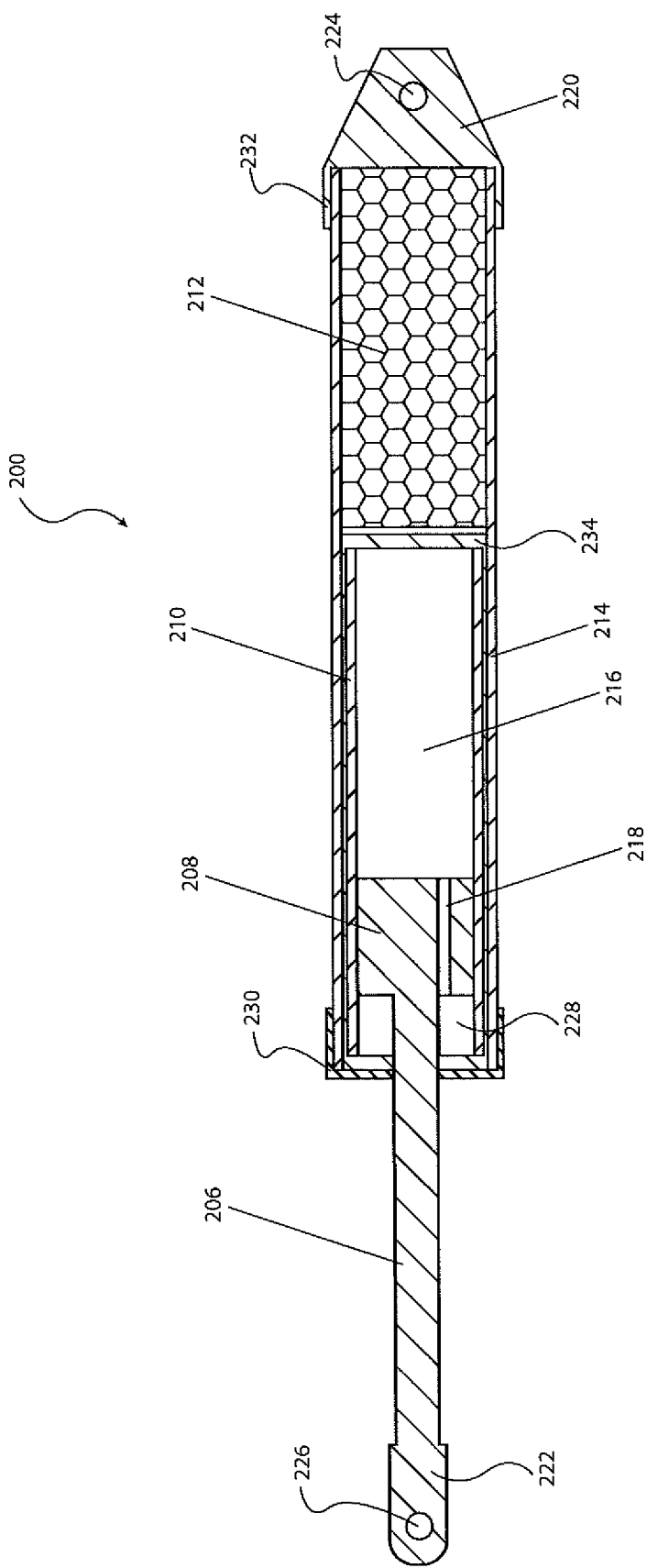
FIG. 1 is a diagram of a shock absorber in accordance with an aspect of the disclosure.

The disclosure will now be described with reference to the drawing figures, in which like reference numerals refer to like parts throughout.

Figure 2:
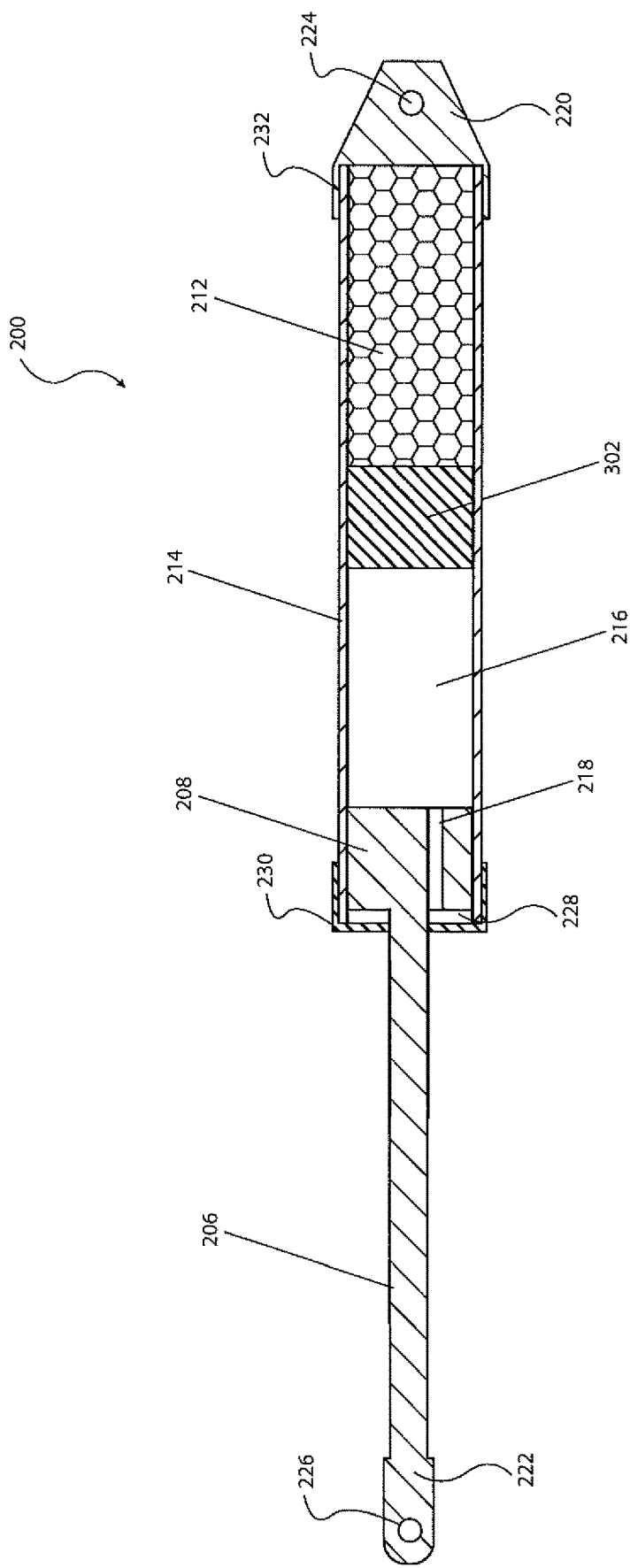
FIG. 2 is a diagram of a shock absorber in accordance with another aspect of the disclosure.

FIG. 1 is a diagram of a shock absorber in accordance with an aspect of the disclosure; and FIG. 2 is a diagram of a shock absorber in accordance with another aspect of the disclosure.

In particular, FIGS. 1 and 2 illustrate a cross-sectional view of a shock absorber 200. The shock absorber 200 may include a first end 220 and a second end 222. In one aspect, the first end 220 may be configured as a clevis having a fastener reception portion 224 that may be configured to be mechanically fastened to another structure. In one aspect, the second end 222 may be configured as a clevis having a fastener reception portion 226 that may be configured to may be mechanically fastened to another structure. In one aspect, the second end 222 may be mechanically fastened directly and/or indirectly to a fixed or mobile structure. In one aspect, the first end 220 may be mechanically fastened directly and/or indirectly to a fixed or mobile structure.

Figure 5:
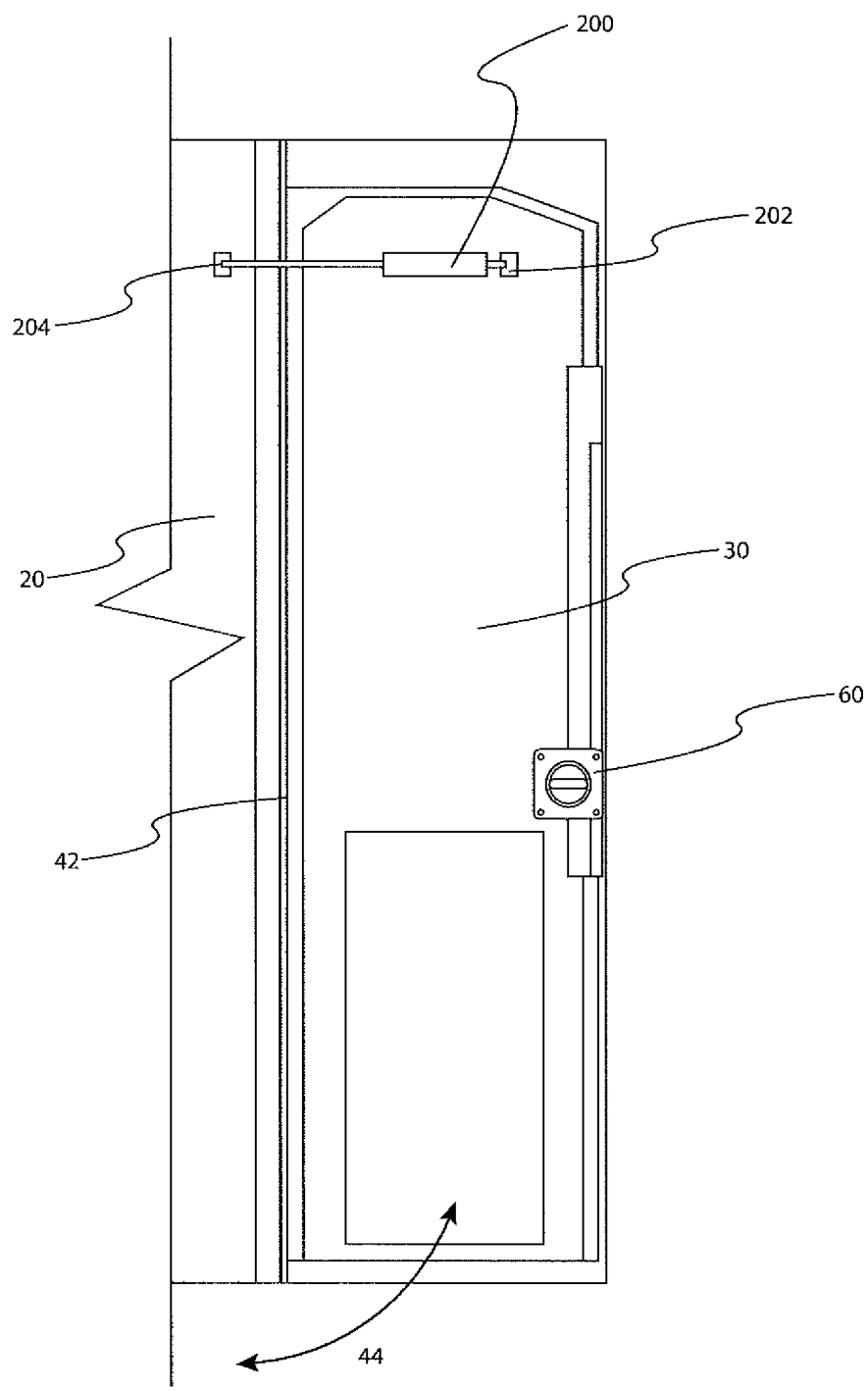
FIG. 5 is a diagram of an aircraft cockpit door and a cockpit door shock absorber in accordance with an aspect of the disclosure.

In one aspect relating to the aircraft implementation described herein and illustrated in FIG. 5, the first end 220 may be mechanically fastened to a first attachment 202 that may be mechanically fastened to a cockpit door 30. In one aspect, the first end 220 may be mechanically fastened to the cockpit door 30. In one aspect, the first end 220 may be mechanically fastened to the cockpit door 30 through other intervening structures. In one aspect, the first end 220 may be mechanically fastened to the second attachment 204, which may be mechanically fastened to the door post, the door frame, a wall, a divider, a bulkhead, the partition 20, or the like (hereinafter the partition 20). In one aspect, the first end 220 may be mechanically fastened directly to a partition 20. In one aspect, the first end 220 may be mechanically fastened to the partition 20 through other intervening structures. In one aspect, the second end 222 may be mechanically fastened directly and/or indirectly to a fixed or movable structure.

In one aspect relating to the aircraft implementation described herein and illustrated in FIG. 5, the second end 222 may be mechanically fastened to the first attachment 202 that may be mechanically fastened to the cockpit door 30. In one aspect, the second end 222 may be mechanically fastened to the cockpit door 30. In one aspect, the second end 222 may be mechanically fastened to the cockpit door 30 through other intervening structures. In one aspect, the second end 222 may be mechanically fastened to the second attachment 204, which be mechanically fastened to a door post, a door frame, a wall, a divider, a bulkhead, the partition 20, or the like (hereinafter the partition 20). In one aspect, the second end 222 may be mechanically fastened directly to the partition 20. In one aspect, the second end 222 may be mechanically fastened to the partition 20 through other intervening structures.

The shock absorber 200 may include a main body 214 that may be directly or indirectly connected to the first end 220. The main body 214 may have a cylindrical, square, polygonal or other shape cross section. The main body 214 may be made from a metallic material, a synthetic material, or the like. In one aspect, the main body 214 may be integral with the first end 220. In one aspect, the main body 214 may be mechanically fastened to the first end 220 through an attachment portion 232.

The shock absorber 200 may include a main shaft 206. The main shaft 206 may have a cylindrical, square, polygonal or other shape cross section. The main shaft 206 may be made from a metallic material, a synthetic material, or the like. In one aspect, the main shaft 206 may be integral with the second end 222. In one aspect, the main shaft 206 may be mechanically fastened to the second end 222.

The main shaft 206 may be partially located in the main body 214 and may be partially located extending from the main body 214. In one aspect, the main shaft 206 may extend through an end cap 230 that is mechanically fastened or integral with the main body 214.

The shock absorber 200 may include a primary piston 208. The primary piston 208 may have a cylindrical, square, polygonal or other shape cross section. The primary piston 208 may be made from a metallic material, a synthetic material, or the like. In one aspect, the primary piston 208 may be integral with the main shaft 206. In one aspect, the primary piston 208 may be mechanically fastened to the main shaft 206. The primary piston 208 may be located within the main body 214.

The main body 214 may further be configured to include a partially closed portion defining a first fluid volume 216 and may be further configured to include a partially closed portion defining a second fluid volume 228. The first fluid volume 216 and the second fluid volume 228 may be configured to contain a fluid. The fluid may be a liquid such as an oil, hydraulic oil, a gas such as nitrogen, or the like.

The primary piston 208 may be configured with an orifice 218 extending along a longitudinal length of the primary piston 208. The primary piston 208 may be positioned in the main body 214 between the first fluid volume 216 and the second fluid volume 228. The orifice 218 may fluidly connect the first fluid volume 216 and the second fluid volume 228.

During the first operational mode as defined herein, the distance between the first end 220 and the second end 222 may vary by movement of the main shaft 206 and the primary piston 208 into the main body 214. In particular, during movement of the movable structure, the main shaft 206 may be forced into the main body 214 and move the primary piston 208 toward the first end 220. For example, during opening of the cockpit door 30, the main shaft 206 will be forced into the main body 214 and move the primary piston 208 toward the first end 220. During this movement, the primary piston 208 will reduce the volume of the first fluid volume 216 and the fluid in the first fluid volume 216 may travel through the orifice 218 into the second fluid volume 228. Accordingly, the volume of the second fluid volume 228 will increase.

Further during the first operational mode as defined herein, during reverse movement of the movable structure, the main shaft 206 will be retracted from the main body 214 and move the primary piston 208 away from the first end 220. For example, during closing of the cockpit door 30, the main shaft 206 will be retracted from the main body 214 and move the primary piston 208 away from the first end 220. During this movement, the primary piston 208 will decrease the volume of the second fluid volume 228 and the fluid in the second fluid volume 228 may travel through the orifice 218 into the first fluid volume 216. Accordingly, the volume of the first fluid volume 216 will increase.

The above-noted operation during the first operational mode provides a damped movement of the movable structure or the cockpit door 30 by operation of the movement of the fluid between the first fluid volume 216 and the second fluid volume 228 through the orifice 218. Accordingly, movement of the movable structure or the cockpit door 30 may be slowed during the first operational mode. Moreover, the movement of the movable structure or the cockpit door 30 may be limited by the size of the first fluid volume 216 and the second fluid volume 228. Once movement of the primary piston 208 decreases a volume of the first fluid volume 216 or the second fluid volume 228 to zero, near zero, or the pressure of the fluid exceeds a set value, movement of the movable structure or the cockpit door 30 may be impeded with the exception of the second operational mode described in further detail below.

The main body 214 may further include a deformable material 212. The deformable material 212 may be arranged within the main body 214 between the first end 220 and the first fluid volume 216. In one aspect, the deformable material 212 may be a solid material. In one aspect, the deformable material 212 may include a honeycomb shaped structure. In other aspects, the deformable material 212 may be implemented using other materials that may provide a resilience or crushing for damping movement of the primary piston 208 or absorbing energy of the movement of the primary piston 208 consistent with the disclosure.

In one aspect, the honeycomb shaped structure may have an array of hollow cells formed between thin vertical walls. The hollow cells may have a columnar and hexagonal shape. The honeycomb shaped structure may implement the deformable material 212 with minimal density and relative high out-of-plane compression properties and out-of-plane shear properties. The honeycomb shaped structure may be constructed of a synthetic material, composite material, metallic material, a natural material, or the like. In one aspect, the honeycomb shaped material may be a PLASCORE™ crushable material (available from PLASCORE™, Zeeland, Mich., U.S.A.) such as AltuCore. In one aspect, a longitudinal length of the columns of the honeycomb structure may be arranged perpendicular to the longitudinal axis that extends between the first end 220 and the second end 222. In another aspect, a longitudinal length of the columns of the honeycomb structure may be arranged parallel to the longitudinal axis that extends between the first end 220 and the second end 222.

As described in further detail below, during a decompression event, a sensor system 100 may actuate an actuator 306 associated with a door latch 60 and open the cockpit door 30. In certain scenarios, the pressure differential between the cockpit 40 and the passenger compartment 50 may be large enough such that a force is realized on the cockpit door 30 causing the cockpit door 30 to swing violently open at a high velocity. A velocity that is greater than the first operational mode velocity as defined herein. The shock absorber 200 may be arranged as described herein with the cockpit door 30 to reduce the velocity of the movement of the cockpit door 30.

Initially, the shock absorber 200 may operate in the first operational mode to provide a damped movement of the movable structure or the cockpit door 30 by operation of the movement of the fluid between the first fluid volume 216 and the second fluid volume 228 through the orifice 218. Thereafter, if the pressure realized on the movable structure or the cockpit door 30 results in continued movement of the movable structure or the cockpit door 30, the shock absorber 200 may operate in the second operational mode.

In the second operational mode, the main shaft 206 as well as the primary piston 208 continue move toward the first end 220. In this regard, the continued movement of the main shaft 206 as well as the primary piston 208 may start to crush the deformable material 212. The deformable material 212 will absorb the energy of the continued movement of the main shaft 206 as well as the primary piston 208 and reduce the rotational velocity of the cockpit door 30. This reduces the possibility of damage, injury, and the like from the movement of the cockpit door 30 during a decompression event. In one aspect, if the primary piston 208 is moved very fast and the fluid cannot exit the orifice 218 fast enough, the fluid is compressed and its pressure is increased, which causes crushing of the deformable material 212. This functionality thus dissipating or absorbing the energy by deforming the deformable material 212 permanently or temporarily. In various aspects, the shock absorber 200 is designed to transmit the energy in a direct or indirect manner to the deformable material 212.

In a particular aspect of FIG. 1, the first fluid volume 216, the primary piston 208, and the second fluid volume 228 may all be further housed within a cylinder body 210. The cylinder body 210 may have a cylindrical, square, polygonal or other shape cross section. The cylinder body 210 may be made from a metallic material, a synthetic material, or the like. In this aspect, during the second operational mode, the main shaft 206 as well as the primary piston 208 continue move toward the first end 220. In this regard, the continued movement of the main shaft 206 as well as the primary piston 208 along with the cylinder body 210 may start to crush the deformable material 212. The deformable material 212 will absorb the energy of the continued movement of the main shaft 206, the primary piston 208, and the cylinder body 210 and reduce the rotational velocity of the cockpit door 30.

In some aspects, the first fluid volume 216, the primary piston 208, the second fluid volume 228, and the cylinder body 210 may be further housed in a housing 234 which may surround each of these components. In other aspects, the housing 234 may simply be a wall between the first fluid volume 216 and the deformable material 212.

In a particular aspect of FIG. 2, the first fluid volume 216, the primary piston 208, and the second fluid volume 228 may all be arranged adjacent a secondary piston 302. The secondary piston 302 may have a cylindrical, square, polygonal or other shape cross section. The secondary piston 302 may be made from a metallic material, a synthetic material, or the like. In this aspect, during the second operational mode, the main shaft 206 as well as the primary piston 208 may continue to move toward the first end 220. In this regard, the continued movement of the main shaft 206 as well as the primary piston 208 may force the secondary piston 302 to move, which may start to crush the deformable material 212. The deformable material 212 will absorb the energy of the continued movement of the main shaft 206, the primary piston 208, and the secondary piston 302 and reduce the rotational velocity of the cockpit door 30.

Accordingly, the shock absorber 200 may be configured for operation in the first operational mode and the second operational mode as defined herein. The shock absorber 200 may operate in the first operational mode by operating the shock absorber 200 based on a fluid damping structure that is implemented at least by the primary piston 208, the first fluid volume 216, the second fluid volume 228, the orifice 218 and the fluid associated therewith. The shock absorber 200 may operate in the second operational mode by operating the shock absorber 200 based on a solid deformable energy absorbing material that is implemented at least by the primary piston 208 and the deformable material 212.

Accordingly, the disclosure has described a shock absorber 200 that provides an extreme range of shock absorption to an application to limit damage and injury.

Figure 3:
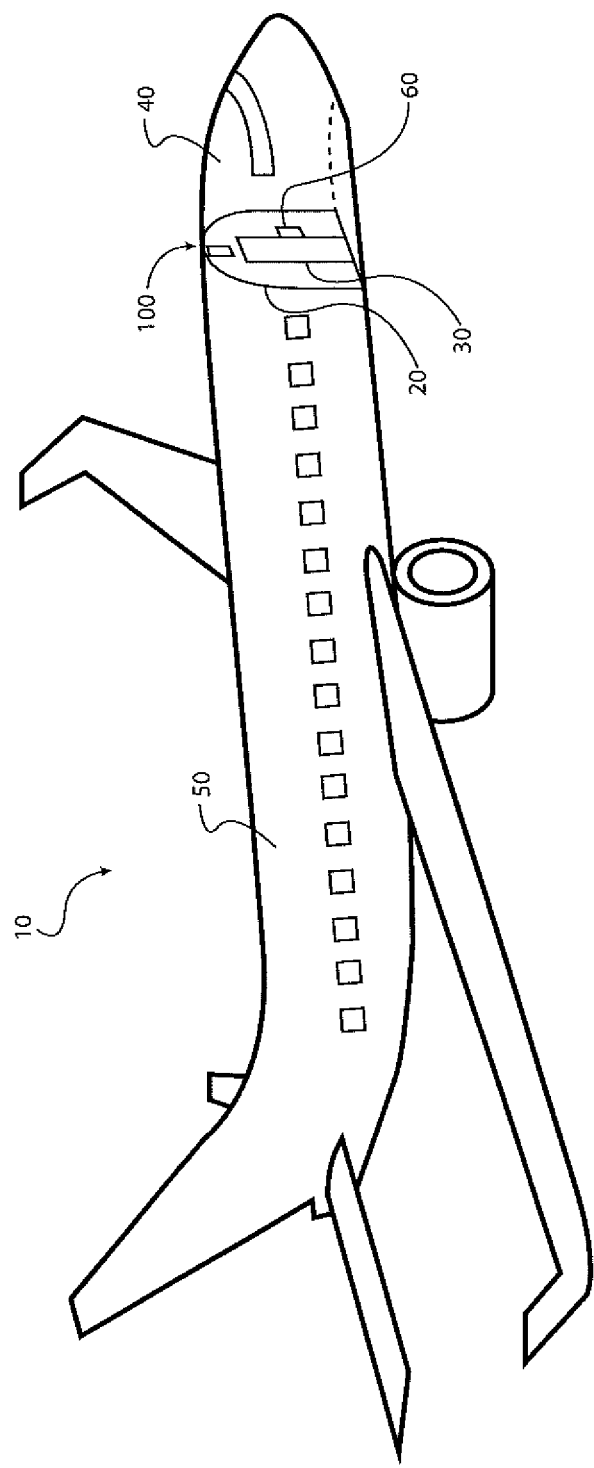
FIG. 3 is a diagram of an aircraft showing both internal components and external components in accordance with an aspect of the disclosure.

FIG. 3 is a diagram of an aircraft showing both internal components and external components in accordance with an aspect of the disclosure.

As depicted in FIG. 3, a sensor system 100 may be mounted in an aircraft 10 within the cockpit 40 to monitor the pressure within the cockpit 40. Additionally, the pressure within an adjacent compartment, such as passenger compartment 50, a cargo compartment, or the like may also be monitored by the sensor system 100. If a large enough pressure drop, or change in pressure ΔP, is detected in the cockpit 40 (or, in some aspects, passenger compartment 50), the sensor system 100 sends a notification signal to another device, system, actuator, etc.

For those aspects in which both the cockpit 40 and the passenger compartment 50 are monitored, a typical response to the notification signal provided by sensor system 100 may be, for example, activating a door latch 60 to open a cockpit door 30 to allow pressure equalization between the cockpit 40 and the passenger compartment 50. The sensor system 100 may be further configured to distinguish between percussive events such as a gunshot, small explosion, and the like and actual decompression events.

Figure 4:
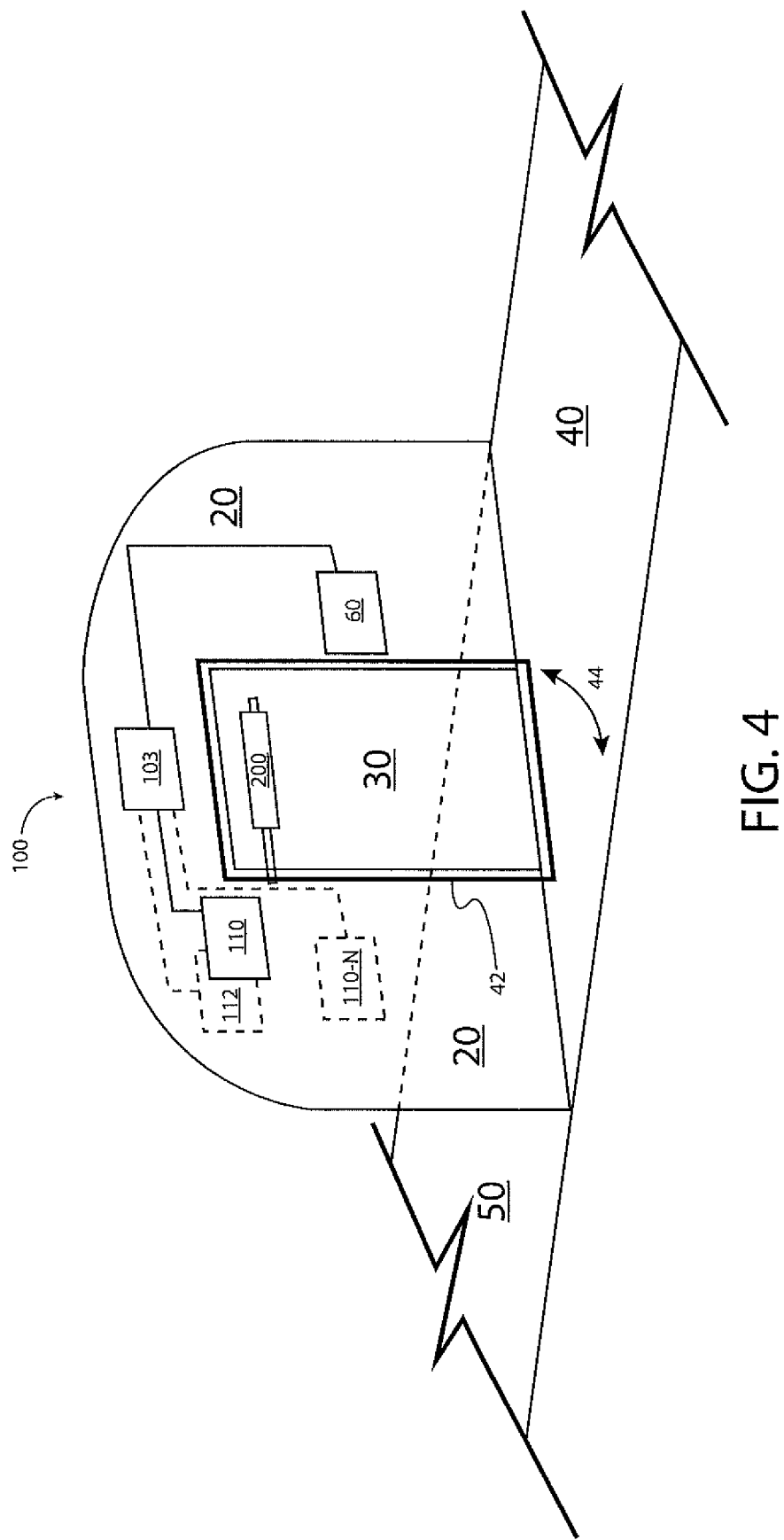
FIG. 4 is a diagram of an expanded section of the airplane of FIG. 3.

FIG. 4 is a diagram of an expanded section of the airplane of FIG. 3.

In particular, FIG. 4 is a diagram of the sensor system 100 that may include a system controller 103, that may be installed within the cockpit 40 or otherwise located within the aircraft 10. The system controller 103 may be coupled or responsive to a pressure sensor 110. In one aspect, the pressure sensor 110 may be an electronic absolute pressure sensitive device.

In one aspect, the pressure sensor 110 senses the pressure within either the cockpit 40 or the passenger compartment 50. In one aspect, the pressure sensor 110 may be installed within cockpit 40, and a pressure sensor 112 may be remotely installed within the passenger compartment 50. If the pressure drop sensed by the pressure sensor 110 or the pressure sensor 112 is large enough, i.e., meets a predetermined pressure drop target, the system controller 103 may provide a notification signal to another device, system, apparatus, etc. The notification may include informing the pilot of a decompression event via a visual or an auditory indication. Additionally, the system controller 103 may activate the door latch 60 to open the cockpit door 30 to allow pressure equalization between the cockpit 40 and the passenger compartment 50.

The pressure sensor 110 may be installed generally within the cockpit 40, such as, for example, on the partition 20, etc.; alternatively the pressure sensor 110 may be located within the system controller 103 and ported to the cockpit 40. Additionally, the various aspects the system controller 103, the pressure sensors 110 and 112, and the attendant cables, connectors, etc., may be shielded from tampering.

The cockpit door 30 may be attached to the partition 20 by at least one hinge 42. The at least one hinge 42 being configured to hold the cockpit door 30 as well as to easily allow the cockpit door 30 to rotate between a closed position and an open position as indicated by arrow 44. In particular, the at least one hinge 42 may be mechanically fastened to the cockpit door 30 as well as mechanically fastened directly or indirectly to the partition 20, an intermediate structure such as a doorjamb to the partition 20, or the like. The at least one hinge 42 may be implemented utilizing any known hinge technology including spring hinge, barrel hinge, pivot hinges, butt/mortise hinges, case hinges, continuous hinges, or piano hinges, concealed hinges, butterfly hinges or parliament hinges, flag hinges, strap hinges, H hinges, HL hinges, or the like.

The cockpit door 30 further includes the shock absorber 200. The shock absorber 200 may be attached to the cockpit door 30 at one end; and the shock absorber 200 may be attached to an adjacent structure at another end. The adjacent structure may be a wall, a divider, a bulkhead, the partition 20, or the like.

The shock absorber 200 may be configured to have at least two operational modes. The first operational mode being defined as a normal operational mode; and the second operational mode being defined as a decompression event mode. The first operational mode including scenarios where the pilot opens the cockpit door 30 to gain entry to the cockpit. In one aspect, the first operational mode being such that the cockpit door 30 is rotationally opened at a rate of door tip speed less than 10 ft./s. In one aspect, the first operational mode being such that the cockpit door 30 is rotationally opened at a rate of door tip speed less than 40 ft./s. In one aspect, the first operational mode being such that the cockpit door 30 is rotationally opened at a rate of door tip speed less than 67 ft./s The second operational mode being such that the cockpit door 30 is rotationally opened at a rate of door tip speed greater than the first operational mode. The second operational mode being a mode of operation during a decompression event.

The cockpit door 30 may be formed of a synthetic material, a metallic material, or a combination thereof. The cockpit door 30 may include a substantially rectangular panel structure. In one aspect, the cockpit door 30 may include a lightweight armored panel. The cockpit door 30 and/or the associated panel may be adapted for ballistic resistance and structural integrity. In one particular aspect, the cockpit door 30 and/or associated panel may be configured to meet the FAA mandated requirements applied to aircraft interior doors and bulkheads for resistance to forcible intrusion by unauthorized persons and resistance to penetration by small arms fire and fragmentation devices. Various aspects of the cockpit door 30 and associated panel are described by Applicant's U.S. Pat. No. 9,279,641 issued Mar. 8, 2016 and incorporated by reference in its entirety.

FIG. 5 is a diagram of an aircraft cockpit door and a cockpit door shock absorber in accordance with an aspect of the disclosure.

In particular, FIG. 5 illustrates a more detailed illustration of an exemplary installation of the shock absorber 200 with the cockpit door 30. The shock absorber 200 may be located vertically along any position of the cockpit door 30. In one aspect, the shock absorber 200 may be located close to a top of the cockpit door 30. Other locations are contemplated as well. Additionally, the shock absorber 200 is shown located on the cockpit door 30 inside the cockpit 40. Alternatively, the shock absorber 200 may be located on the cockpit door 30 inside the passenger compartment 50. In a further aspect, a first one of the shock absorber 200 may be located on the cockpit door 30 inside the cockpit 40 and a second one of the shock absorber 200 may be located on the cockpit door 30 inside the passenger compartment 50.

In one aspect, the shock absorber 200 may be mechanically fastened to a first attachment 202. The first attachment 202 may be mechanically fastened to the cockpit door 30. In other aspects, the shock absorber 200 may be directly connected to the cockpit door 30. In other aspects, the shock absorber 200 may be connected to the cockpit door 30 through other intervening structures.

In one aspect, the shock absorber 200 may be mechanically fastened to a second attachment 204. The second attachment 204 may be mechanically fastened to a wall, a divider, a bulkhead, the partition 20, or the like (hereinafter the partition 20). In other aspects, the shock absorber 200 may be directly connected to the partition 20. In other aspects, the shock absorber 200 may be connected to the partition 20 through other intervening structures.

In various aspects, mechanically fastened as described herein is meant to include utilization of one or more of bolts, nuts, screws, rivets, adhesive, welding, crimping, pins, anchors, and the like.

FIG. 5 further illustrates the door latch 60 that in some aspects may be implemented as a deadbolt. The door latch 60 may include a latch housing that is attached to a cockpit door 30 or is structured and arranged inside the cockpit door 30. The latch housing may include one or more mechanical fasteners to secure the latch housing to the cockpit door 30. The latch housing may include a latch bolt as well as supporting structure to allow the latch bolt to extend into a strike plate that is attached to a doorjamb.

The door latch 60 may further include an actuator 306. The actuator 306 may be an electromechanical actuator, a pyrotechnic actuator, a mechanical actuator, or the like. The actuator 306 may be directly connected to the latch bolt and movement of the actuator 306 will likewise move the latch bolt to place the door latch 60 in a locked configuration such that the cockpit door 30 may remain closed. In a similar manner, reverse movement of the actuator 306 will likewise move the latch bolt in a reverse direction to place the door latch 60 in an unlocked configuration such that the cockpit door 30 may open. In other aspects, the actuator 306 may include intervening mechanical components such that the movement noted above is mechanically applied to the latch bolt in a similar manner.

The actuator 306 is responsive to a signal from the sensor system 100. The signal from the sensor system 100 being generated in response to a decompression event as described herein. After receiving the signal from the sensor system 100, the actuator 306 may be actuated such that it moves the latch bolt to place the cockpit door 30 in the unlocked and opened configuration. In this unlocked and opened configuration, air is able to travel between the passenger compartment 50 and the cockpit 40 and there is no or little pressure differential between the passenger compartment 50 in the cockpit 40 thus preventing or reducing any possible damage.

Figure 6:
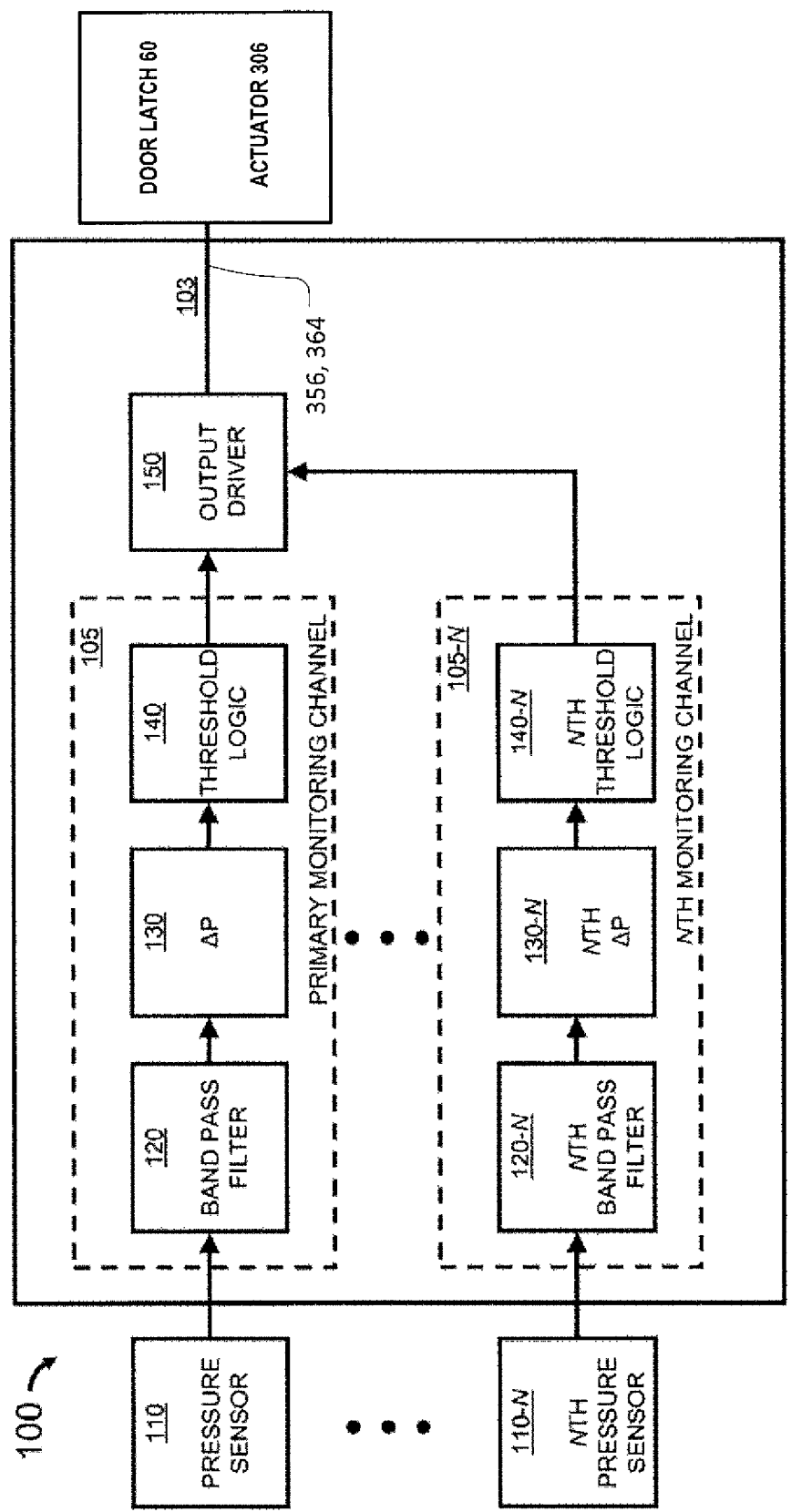
FIG. 6 is a block diagram of a system for monitoring pressure in an aircraft in accordance with an aspect of the disclosure.

FIG. 6 is a block diagram of a system for monitoring pressure in at least one compartment of an aircraft in accordance with an aspect of the disclosure.

The sensor system 100 generally includes at least one pressure sensor 110 coupled to the system controller 103. The system controller 103 may include at least a primary monitoring channel 105 and an output driver 150. In one aspect, the output driver 150 provides a driver signal associated with the decompression event to the door latch 60 to initiate the actuator 306 and open the cockpit door 30. In particular, the output driver 150 provides a driver signal associated with the decompression event to the at least one wire 356 and/or at least one wire 364 to initiate the actuator 306 and open the cockpit door 30.

The system controller 103 may be implemented a number of different ways. In one aspect, the system controller 103 may be implemented by a dedicated analog circuit. In one aspect, the system controller 103 may be implemented by a dedicated computer processor. In one aspect, the system controller 103 may be implemented by an application specific integrated circuit (ASIC). In one aspect, the system controller 103 may be implemented by a field programmable gate array (FPGA). In one aspect, the system controller 103 may be implemented by the flight warning system. In one aspect, the system controller 103 may be implemented by an avionics system. In one aspect, the system controller 103 may be implemented by the central maintenance system.

The system controller 103 may be implemented by any of the above noted systems and may be configured to provide one or more of the following described processes and/or functions. In one aspect, the system controller 103 may be configured such that the primary monitoring channel 105 may include a band pass filtering functionality, a pressure change determination functionality, and a pressure threshold determination functionality. In one aspect, the system controller 103 may implement digital signal processing capability and/or software for band pass filtering functionality, pressure change determination functionality, and pressure threshold determination functionality. In one aspect, the system controller 103 may be configured such that the primary monitoring channel 105 may include a band pass filter 120, a pressure change signal circuit 130, and a threshold logic circuit 140. In other aspects, the system controller 103 may include multiple monitoring channels 105 to 105-N, each of the N channels coupled to a respective pressure sensor 110-N.

The pressure sensor 110 may provide a pressure signal corresponding to a pressure $P_1$ within the compartment of the aircraft 10, and the band pass filter 120 may receive and filter the pressure sensor signals. The band pass filter 120 may advantageously reduce the operational noise floor and provide sensitivity only to regions of interest.

The pressure change signal circuit 130 receives the filtered pressure signal, determines a change in pressure $\Delta P_1$, and provides a pressure change output signal corresponding to the change in pressure $\Delta P_1$. This value may then be provided to the threshold logic circuit 140. The threshold logic circuit 140 determines whether the pressure change output signal meets a predetermined threshold and provides a threshold output signal, indicating that a decompression event has occurred, to the output driver 150 if the pressure change output meets the predetermined threshold.

In one aspect, the output driver 150 provides a notification signal associated with the decompression event to the door latch 60 to initiate the actuator 306 and open the cockpit door 30.

In additional aspects, the output driver 150 provides a notification signal associated with the decompression event to another device, system, actuator, etc.

In an aspect that include N pressure sensors 110 to 110-N, the system controller 103 includes N monitoring channels 105 to 105-N, each of which is coupled to a respective pressure sensor 110-N. Each of the N monitoring channels is coupled to the output driver 150, which provides the notification signal if any N monitoring channel's threshold logic indicates a decompression event has occurred. Alternatively, the output driver 150 may operate based on a more advanced paradigm, such as a voting system in response to one or more N monitoring channel's threshold logic indicating a decompression event has occurred. In addition, the multiple monitoring channels may be used in a compartment to provide redundancy.

Figure 7:
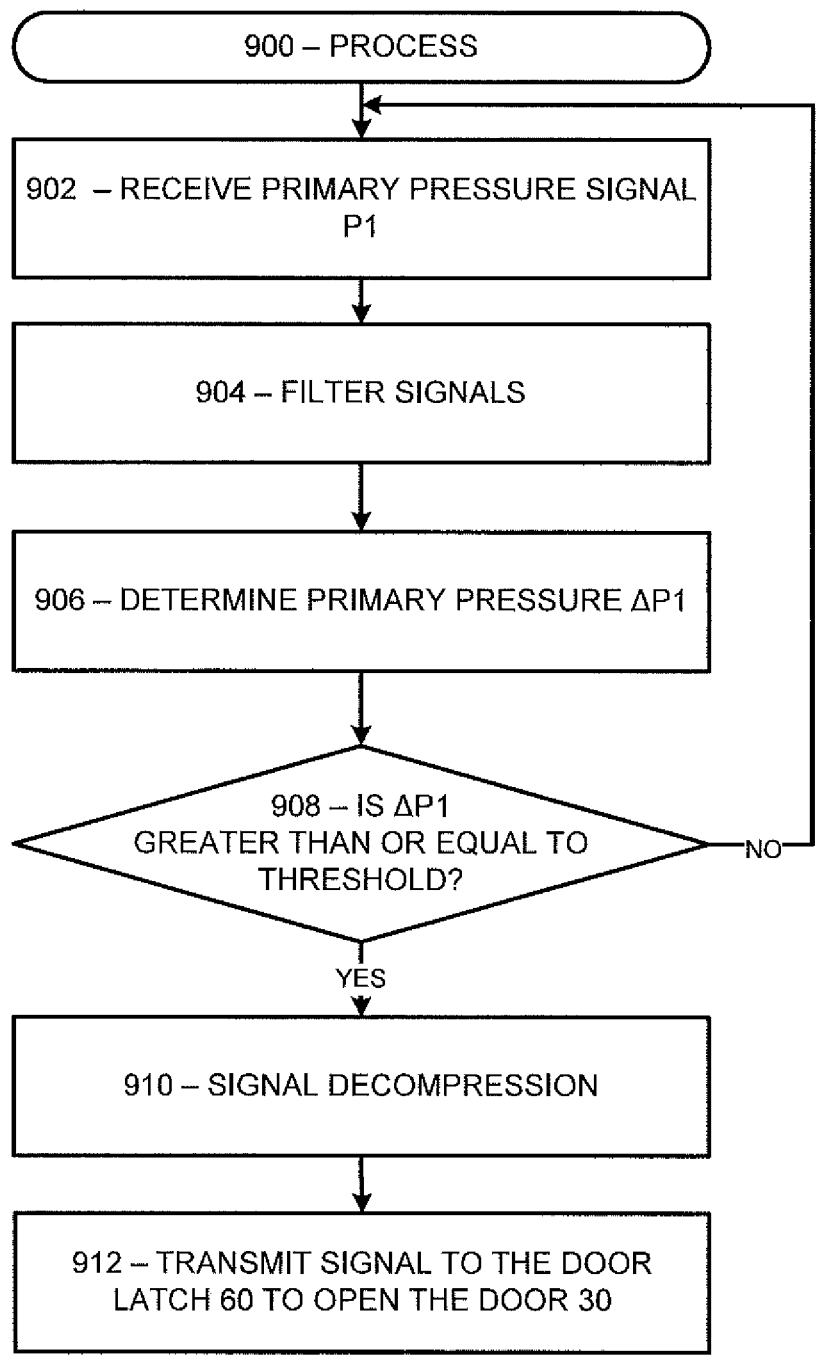
FIG. 7 is a flow chart of a method of monitoring pressure in an aircraft according to an aspect of the disclosure.

FIG. 7 is a flow chart of a method of monitoring pressure in a compartment of an aircraft according to an aspect of the disclosure.

In particular, FIG. 7 illustrates a process 900 for monitoring a primary monitoring channel 105. It should be appreciated that, if additional monitoring channels are used, there would be a similar process associated with each monitoring channel. The process 900 may be implemented in hardware or software by the system controller 103 and/or the sensor system 100. The process 900 for the primary monitoring channel 105 may include receiving a pressure signal 902 corresponding to a pressure $P_1$ within a compartment of an aircraft 10 (such as, for example, cockpit 40).

In one aspect, at step 904, signals are filtered that are outside of a predetermined frequency band. In particular, the signals may be filtered by a filter or filter software implemented by the system controller 103 and/or the sensor system 100.

Next, a change in pressure $\Delta P_1$ is determined 906 by the system controller 103 and/or the sensor system 100.

At step 908, a determination is made as to whether the pressure change $\Delta P_1$ meets a predetermined threshold. In the illustrated step 908, a greater than or equal to comparison is made, although the disclosure is not intended to be so limited. If the determination is NO, then the process 900 returns to step 902. If the determination is YES, then a notification signal is provided indicating that a decompression event has occurred 910, which is generated by the system controller 103 and/or the sensor system 100.

At step 912, the output driver 150 may transmit a signal over at least one wire 356 and/or at least one wire 364 to the door latch 60 to initiate the actuator 306. In one aspect, the output driver 150 provides a notification signal associated with the decompression event to the door latch 60 to initiate the actuator 306 and open the cockpit door 30.

Aspects of the disclosure may additionally include means for performing any of the above-described actions and/or steps. Additionally, the system controller 103 and/or the sensor system 100 may include additional features as described in Applicant's United States patent publication number 2011/0201262, published Aug. 18, 2011 and incorporated by reference herein in its entirety.

Accordingly, the disclosure has disclosed a mechanism that limits movement of the cockpit door 30 during episodes of decompression to limit damage and injury.

Further in accordance with various aspects of the disclosure, the methods described herein are intended for operation with dedicated hardware implementations including, but not limited to, PCs, semiconductors, application specific integrated circuits (ASIC), programmable logic arrays, cloud computing devices, field programmable gate array (FPGA), and other hardware devices constructed to implement the methods described herein.

It should also be noted that any software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. For example, the system controller 103 may be implemented as a decompression and door actuation controller; the sensor system 100 may be implemented as a decompression and door actuation system. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A shock absorber configured to reduce rotational velocity, comprising:
   a first end configured to be mechanically fastened to a first component;
   a second end configured to be mechanically fastened to a second component;
   a main body that is attached to the first end;
   a main shaft that is attached to the second end;
   a primary piston configured to be received in the main body;
   the primary piston being attached to the main shaft and the primary piston being further configured to be movable with the main shaft;
   the primary piston configured to move within the main body and further configured to provide a first damping force to reduce rotational velocity by movement of a fluid through the primary piston while the main shaft moves a first distance during rotational movement at a first rate of speed of one of the first component and the second component;
   a deformable solid material arranged in the main body; and
   the primary piston configured to further move within the main body and further configured to provide a second damping force to reduce rotational velocity by deforming the deformable solid material after the main shaft moves the first distance during rotational movement at a second rate of speed of one of the first component and the second component, the second rate of speed of one of the first component and the second component being greater than the first rate of speed of one of the first component and the second component,
   wherein one of the first component and the second component comprises a fixed structure; and
   wherein another one of the first component and the second component comprises a movable structure.

2. The shock absorber of claim 1, further comprising:
   a secondary cylinder body configured to receive the primary piston; and
   the secondary cylinder body configured to be received in the main body,
   wherein the secondary cylinder body is configured to further move within the main body and further configured to provide the second damping force to reduce rotational velocity by deforming the deformable solid material after the main shaft moves the first distance; and
   wherein the deformable solid material is configured to absorb an energy of rotational movement at the second rate of speed of one of the first component and the second component.

3. The shock absorber of claim 1, further comprising:
   a secondary piston body configured to be received in the main body; and
   the secondary piston body configured to be moved in the main body by movement of the primary piston,
   wherein the secondary piston body is configured to further move within the main body and further configured to provide the second damping force to reduce rotational velocity by deforming the deformable solid material after the main shaft moves the first distance; and
   wherein the deformable solid material is configured to absorb an energy of rotational movement at the second rate of speed of one of the first component and the second component.

4. The shock absorber of claim 1, further comprising:
   an orifice arranged in the primary piston configured to transfer the fluid through the primary piston,
   wherein the deformable solid material is configured to be permanently crushed during rotational movement at the second rate of speed of one of the first component and the second component.

5. The shock absorber of claim 1, wherein the deformable solid material comprises a honeycomb structure,
   wherein the deformable solid material is configured to be crushed during rotational movement at the second rate of speed of one of the first component and the second component.

6. The shock absorber of claim 1, further comprising:
   a first fluid volume arranged on one side of the primary piston within the main body;
   a second fluid volume arranged on another side of the primary piston within the main body; and a housing configured to surround the first fluid volume, the second fluid volume, and the primary piston and the housing comprises a wall between the first fluid volume and the deformable solid material.

7. The shock absorber of claim 1, further comprising:
a first fluid volume arranged on one side of the primary piston within the main body;
a second fluid volume arranged on another side of the primary piston within the main body; and
an orifice arranged in the primary piston configured to transfer the fluid through the primary piston between the first fluid volume and the second fluid volume,
wherein the deformable solid material comprises a honeycomb structure; and
wherein the deformable solid material is configured to be crushed during rotational movement at the second rate of speed of one of the first component and the second component.

8. An aircraft system comprising the shock absorber of claim 1,
wherein the movable structure comprises an aircraft cockpit door; and
wherein the primary piston configured to further move within the main body and further configured to provide the second damping force to reduce rotational velocity of the aircraft cockpit door by deforming the deformable solid material after the main shaft moves the first distance during rotational movement at the second rate of speed of the aircraft cockpit door, the second rate of speed of the aircraft cockpit door being greater than the first rate of speed of one of the aircraft cockpit door.

9. The aircraft system of claim 8, wherein the shock absorber further comprises:
a first fluid volume arranged on one side of the primary piston within the main body;
a second fluid volume arranged on another side of the primary piston within the main body;
a housing configured to surround the first fluid volume, the second fluid volume, and the primary piston and the housing comprises a wall between the first fluid volume and the deformable solid material; and
an orifice arranged in the primary piston configured to transfer the fluid through the primary piston between the first fluid volume and the second fluid volume,
wherein the deformable solid material comprises a honeycomb structure.

10. The aircraft system of claim 8, further comprising:
a door latch structured and arranged in the aircraft cockpit door that comprises an actuator and a latch bolt;
the actuator configured to move the latch bolt when the actuator is actuated;
a pressure sensor configured to provide a pressure signal corresponding to a pressure within a compartment of an aircraft;
a controller responsive to the pressure signal corresponding to the pressure within a compartment of an aircraft from the pressure sensor;
the controller further configured to determine a decompression event based on the pressure signal corresponding to the pressure within a compartment of an aircraft from the pressure sensor; and
an output driver configured to generate and output a driver signal to actuate the actuator when the controller determines the decompression event based on the pressure signal corresponding to the pressure within the compartment of the aircraft from the pressure sensor.

11. A process of implementing a shock absorber configured to reduce rotational velocity, comprising:
configuring a first end to be mechanically fastened to a first component;
configuring a second end to be mechanically fastened to a second component;
configuring a main body to be attached to the first end;
configuring a main shaft to be attached to the second end;
configuring a primary piston to be received in the main body;
configuring the primary piston to be attached to the main shaft and the primary piston being further configured to be movable with the main shaft;
configuring the primary piston to move within the main body to provide a first damping force to reduce rotational velocity by movement of a fluid through the primary piston while the main shaft moves a first distance during rotational movement at a first rate of speed of one of the first component and the second component;
configuring a deformable solid material in the main body;
configuring the primary piston to further move within the main body to provide a second damping force to reduce rotational velocity by deforming the deformable solid material after the main shaft moves the first distance during rotational movement at a second rate of speed of one of the first component and the second component, the second rate of speed of one of the first component and the second component being greater than the first rate of speed of one of the first component and the second component,
wherein one of the first component and the second component comprises a fixed structure; and
wherein another one of the first component and the second component comprises a movable structure.

12. The process of claim 11, further comprising:
a secondary cylinder body configured to receive the primary piston; and
the secondary cylinder body configured to be received in the main body,
wherein the secondary cylinder body is configured to further move within the main body and further configured to provide the second damping force to reduce rotational velocity by deforming the deformable solid material after the main shaft moves the first distance; and
wherein the deformable solid material is configured to absorb an energy of rotational movement at the second rate of speed of one of the first component and the second component.

13. The process of claim 11, further comprising:
a secondary piston body configured to be received in the main body; and
the secondary piston body configured to be moved in the main body by movement of the primary piston,
wherein the secondary piston body is configured to further move within the main body and further configured to provide the second damping force to reduce rotational velocity by deforming the deformable solid material after the main shaft moves the first distance; and
wherein the deformable solid material is configured to absorb an energy of rotational movement at the second rate of speed of one of the first component and the second component.

14. The process of claim 11, further comprising:
configuring an orifice in the primary piston configured to transfer the fluid through the primary piston, wherein the deformable solid material is configured to be permanently crushed during rotational movement at the second rate of speed of one of the first component and the second component.

15. The process of claim 11, wherein the deformable solid material comprises a honeycomb structure,
wherein the deformable solid material is configured to be crushed during rotational movement at the second rate of speed of one of the first component and the second component.

16. The process of claim 11, further comprising:
a first fluid volume arranged on one side of the primary piston within the main body;
a second fluid volume arranged on another side of the primary piston within the main body; and
a housing configured to surround the first fluid volume, the second fluid volume, and the primary piston and the housing comprises a wall between the first fluid volume and the deformable solid material.

17. The process of claim 11, further comprising:
a first fluid volume arranged on one side of the primary piston within the main body;
a second fluid volume arranged on another side of the primary piston within the main body; and
an orifice arranged in the primary piston configured to transfer the fluid through the primary piston between the first fluid volume and the second fluid volume,
wherein the deformable solid material comprises a honeycomb structure; and
wherein the deformable solid material is configured to be crushed during rotational movement at the second rate of speed of one of the first component and the second component.

18. A process of implementing an aircraft system comprising the process of implementing the shock absorber of claim 11,
wherein the movable structure comprises an aircraft cockpit door; and
wherein the primary piston configured to further move within the main body and further configured to provide the second damping force to reduce rotational velocity of the aircraft cockpit door by deforming the deformable solid material after the main shaft moves the first distance during rotational movement at the second rate of speed of the aircraft cockpit door, the second rate of speed of the aircraft cockpit door being greater than the first rate of speed of one of the aircraft cockpit door.

19. The process of claim 18, wherein the shock absorber further comprises:
a first fluid volume arranged on one side of the primary piston within the main body;
a second fluid volume arranged on another side of the primary piston within the main body;
a housing configured to surround the first fluid volume, the second fluid volume, and the primary piston and the housing comprises a wall between the first fluid volume and the deformable solid material; and
an orifice arranged in the primary piston configured to transfer the fluid through the primary piston between the first fluid volume and the second fluid volume,
wherein the deformable solid material comprises a honeycomb structure.

20. The process of claim 18, further comprising:
arranging a door latch in the aircraft cockpit door that comprises an actuator and a latch bolt;
configuring the actuator to move the latch bolt when the actuator is actuated;
generating a pressure signal corresponding to a pressure within a compartment of an aircraft with a pressure sensor;
receiving the pressure signal corresponding to the pressure within a compartment of an aircraft from the pressure sensor with a controller;
determining with the controller a decompression event based on the pressure signal corresponding to the pressure within a compartment of an aircraft from the pressure sensor; and
generating a driver signal with an output driver to actuate the actuator when the controller determines the decompression event based on the pressure signal corresponding to the pressure within the compartment of the aircraft from the pressure sensor.

* * * * *